(12) United States Patent
Xu et al.

(10) Patent No.: US 6,413,308 B1
(45) Date of Patent: Jul. 2, 2002

(54) STRUCTURED BOEHMITE PIGMENT AND METHOD FOR MAKING SAME

(75) Inventors: Wen-Qing Xu; Gary M. Freeman, both of Macon, GA (US)

(73) Assignee: J. M. Huber Corporation, Edison, NJ (US)

( * ) Notice: Subject to any disclaimer, the term of this patent is extended or adjusted under 35 U.S.C. 154(b) by 0 days.

(21) Appl. No.: 09/419,665

(22) Filed: Oct. 15, 1999

(51) Int. Cl.$^7$ ............................... C01F 7/02; C01F 7/44
(52) U.S. Cl. .................. 106/415; 106/461; 106/287.17; 106/286.5; 423/625; 423/629
(58) Field of Search .................. 106/286.5, 287.17, 106/415, 461; 423/625, 629

(56) References Cited

U.S. PATENT DOCUMENTS

| | | | |
|---|---|---|---|
| 4,716,029 A | * 12/1987 | Oguri et al. | ................. 423/625 |
| 5,167,707 A | 12/1992 | Freeman et al. | ............ 106/416 |
| 5,306,680 A | 4/1994 | Fukuda | ....................... 501/153 |

OTHER PUBLICATIONS

Stoffer et al., Formulation of Flat Latex Coatings with Aluminum Trihydroxide as an Extender Pigment for Titanium Dioxide, American Chemical Society, Division of PMSE, Papers 1993 pps. 384–385.

Ginsberg, et al., "Data on Aluminum Oxide Monohydrate", Z. Anorg. Allg. Chemie, vol. 271, Jul. 1952, pp. 41–48.

* cited by examiner

*Primary Examiner*—C. Melissa Koslow
(74) *Attorney, Agent, or Firm*—Carlos Nieves; David Mitchell Goodrich

(57) ABSTRACT

A structured boehmite pigment which comprises a plurality of alumina monohydrate particles. The pigment is particularly useful as a flatting pigment in paint and as an anti-block agent in plastic film. The boehmite pigment has an aggregate median particle size of about 8 to about 30 microns; a total pore volume of at least about 0.8 ml/g; a differential pore volume of less than about 0.3 ml/g; an oil absorption of about 70 to about 135 m/g; a BET surface area of about 3 to about 20 m$^2$/g, and a TAPPI brightness of at least about 90.

19 Claims, 7 Drawing Sheets

STRUCTURED BOEHMITE PIGMENT AND METHOD FOR MAKING SAME

BACKGROUND OF THE INVENTION

The use of mineral fillers or pigments to enhance the properties of products such as paints, papers, rubbers, polymers, plastics or other similar materials is well known. One particular application involves the utilization of such products as flatting agents in paint and coating formulations for reducing the sheen and gloss properties of the same. Many of the mineral fillers and pigments used as flatting agents also find utility in plastic film applications as anti-block agents.

One type of flatting agent for paint and/or other coatings is diatomaceous silica. Diafil® 525 flatting agent (available from C. R. Minerals) is an example of a diatomaceous silica flatting agent which exhibits good flatting performance in paints. Calcination of a diatomaceous silica is often necessary to achieve the higher pigment brightness and whiteness properties typically desired by paint formulators. Calcined diatomaceous silica products also find utility as anti-block agents for plastic film such as polyethylene (PE) film compositions. These anti-block agents are typically used at low addition levels so as to preserve film clarity while still preventing the PE film from sticking to itself. However, the calcination process leads to the formation of large amounts of crystalline silica in the calcined diatomaceous silica product. Such amounts of crystalline silica are undesirable from a worker safety viewpoint. Specifically, the inhalation of crystalline silica is considered to be a serious health hazard.

Another type of flatting and anti-block agent is disclosed in U.S. Pat. No. 5,167,707 to Freeman et al. ("Freeman"), the contents of which are herein incorporated by reference. In this patent, a coarse particle, structured pigment having a sodium alumino-silicate composition (SAMS), prepared from the hydrothermal reaction of delaminated kaolin clays with select sodium silicate reagents, is disclosed. The SAMS pigment described in Freeman was developed as an improvement to existing flatting agents, including the diatomaceous silica types noted above. The patent identifies certain SAMS pigment properties that are preferred for flatting performance when used in paints and for anti-block performance in PE films. More particularly, the SAMS pigment has an oil absorption of from about 90 to 110 g/100 g; an average particle diameter from 12.8–14.8 microns; a specific surface area from 0.68–0.78 $m^2/g$; a BET surface area from 3.0–9.0 $m^2/g$; a total pore volume as determined by mercury intrusion of 1.2–1.8 ml/g; a pore structure with a pore diameter centered at 2.4 microns as determined by log differential intrusion analysis, and a general chemical formula of (0.6–1.6) $Na_2O:Al_2O_3:(4.2-7.5)SiO_2:(1.0-5.0) H_2O$.

The flatting and anti-block agents noted above are not without their disadvantages. For example, the calcined diatomaceous silica products contain crystalline silica at levels which the federal government has identified as carcinogenic. Therefore, specific labeling must be employed when this agent is used in paints. Consequently, there is a considerable desire in the paint and coating industry to find an alternative to replace diatomaceous silica, particularly calcined diatomaceous silica, as a flatting agent.

The health risks associated with the use of crystalline silica in paints is avoided by using the SAMS pigment described in Freeman. However, since this SAMS pigment is derived from a kaolin clay feedstock, the whiteness and brightness values thereof can still be inferior to diatomaceous silica products, particularly those that are calcined. Kaolin clays are typically yellowish white in color owing to the presence of iron oxides and other natural mineral impurities and this color carries over to the final SAMS pigment despite the hydrothermal processing conditions employed in its making.

In view of the deficiencies in the prior art flatting agents noted above, a need exists for alternative flatting agents that do not contain crystalline silica and that do not have a negative impact on pigment brightness, whiteness or other properties. Anti-block agents that do not contain crystalline silica are also desired.

The present invention solves these needs through the development of a highly-structured alumina monohydrate (boehmite) pigment. The structured pigment is made by reacting alumina trihydrate feedstock under hydrothermal conditions at elevated temperatures and pressures in the presence of an alkaline earth metal base to form aggregated plates of the alumina monohydrate.

Alumina trihydrate (i.e., ATH or gibbsite) is a well known pigment in the paper and paint industries. It is frequently used as a white extender pigment in the paper industry. Alumina trihydrate is also used as a raw material for the production of other aluminum compounds such as the preparation of activated aluminas, which are commonly used as absorbents and catalysts. Alumina trihydrate can also be used as a filler in plastics and rubbers due to its fire-retardant and smoke-suppressant properties.

The conversion of gibbsite (alumina trihydrate) into boehmite (alumina monohydrate) under hydrothermal conditions is disclosed in U.S. Pat. No. 5,306,680 to Fukuda. Boehmite is one mineralogical form of alumina monohydrate (AlOOH), that is derived from gibbsite. In the present invention, a fine, flaky boehmite particle is formed by subjecting submicron alumina trihydrate to hydrothermal treatment in water or an alkali solution at elevated temperatures and pressures. The fine, flaky boehmite particles produced by this treatment are useful as a starting material for the preparation of fine, flaky alumina particles or as a filler for rubbers and plastics and as a coating pigment material for paper making.

Alumina trihydrate has also been substituted for Celite®, a calcined diatomaceous silica flatting agent in paint applications available from the Johns-Manville Corporation of Denver, Colo. The publication entitled "Formulation of Flat Latex Coatings With Aluminum Trihydroxide As An Extender Pigment for Titanium Oxide," by Stoffer, et al., American Chemical Society, Division of PMSE, Papers 1993, 569, pp. 384–385, demonstrates that alumina trihydrate can be used successfully as an extender pigment for titanium oxide in flat latex paints.

While the prior art recognizes that boehmite can be made via hydrothermal treatment of alumina trihydrate and that alumina trihydrate can be used in paint applications, the prior art does not teach nor suggest making a highly structured pigment of alumina monohydrate having the properties of the instant invention nor a hydrothermal treatment for making the same.

SUMMARY OF THE INVENTION

The invention comprises a structured boehmite pigment comprising aggregated platelets of alumina monohydrate having physical properties making it suitable for applications in paints, papers, rubbers, polymers and the like. Preferably, the alumina monohydrate product is in the boehmite crystal form as derived from the hydrothermal conversion of gibbsite.

The structured boehmite pigment is made up of platelets of alumina monohydrate which are arranged in a stacked or aggregated configuration. The platelets may be either edge-to-edge, face-to-face, edge-to-face or combinations thereof. The platelets making up the structured pigment are in the micron range, generally ranging in size from about 0.5 to 3.0 microns. The platelet size and resultant structured aggregate particle size can vary depending on the processing conditions as described below.

The physical properties of the structured boehmite pigment make it ideal for pigment applications, particularly as a flatting agent for paint and as an anti-block agent for film. The structured pigment has a total pore volume of at least 0.8 ml/g and, more preferably, of between about 0.8 to 2.5 ml/g. The structured pigment is characterized as having a low to medium structure as defined in Freeman, see column 10, lines 1–15, wherein structure is measured in terms of a pigment's total pore volume as determined by Hg Intrusion Porosimetry.

The aggregate median particle size, as measured by Malvern (LLS) median particle size measurement, is at least about 8 microns and can go as high as about 30 microns. A more preferred median particle size range is between about 10 to 15 microns. In conjunction with the desired median particle size, screen residue residuals for the product should be less than 1% greater than 325 mesh, preferably less than 0.1%. Screen residue values at 325 mesh have a direct bearing on the Hegman Grind values determined in a paint formulation. Such values indicate the smoothness of a paint film.

The structured boehmite pigment has a low differential pore volume (DPV) since low opacity, particularly when the pigment is used as a flatting agent in black or colored enamels, is desirable. A desirable differential pore volume for the inventive structured pigment is a maximum of about 0.3 ml/g, and is preferably less than 0.2 ml/g. The DPV value is the amount of pigment pore volume, as measured in ml/g, that occurs between the pore diameter size range of 0.1–0.4 microns. This is the range of pore sizes that provide the most efficient scattering of visible light. A low pigment DPV value therefore typically translates to low opacifying properties.

Preferred oil absorption values for the structured boehmite pigment of the instant invention vary from 70 to 135 ml/100 g and, more preferably, between 90 and 105 ml/100 g.

The structured boehmite pigment has a BET surface area range of about 3 to 20 $m^2/g$ and, more preferably, about 5 to 10 $m^2/g$.

The structured boehmite pigment is made by first providing a feedstock of alumina trihydrate or aluminum hydroxide particles. The feedstock is hydrothermally treated in the presence of at least water and an alkaline earth metal base under conditions of elevated temperatures and pressures to form the aggregated platelets of alumina monohydrate. Although any alkaline earth metal base can be used, preferred bases include calcium hydroxide, barium hydroxide, strontium hydroxide and magnesium hydroxide or their oxides (CaO, BaO, SrO and MgO).

Although the feedstock can be any type of alumina trihydrate, a preferred feedstock is a dry ground alumina trihydrate with a medium particle size range between about 9 and 10 microns. Other feedstock types and sizes can be utilized as would be within the skill of the art.

It is preferred that the reaction process be conducted with the ATH feedstock as an aqueous slurry, preferably at a reaction solids percent of 8–35% and more preferably at about 27–32%. The reaction temperature can range between about 150–250° C., the temperature varying with the pressure as it is known from the relationship of temperature and pressure from standard steam tables. The time of the hydrothermal treatment will vary with the temperature. The higher the reaction temperature, the less time needed to convert the alumina trihydrate (gibbsite) to the desired alumina monohydrate (boehmite) product. Typically, the hydrothermal conversion from the trihydrate to the monohydrate takes about 20–90 minutes.

The structured boehmite pigment TAPPI brightness is at least 90, such as in the range of about 94 to about 98 and is typically in the range of 94–97.

The structured boehmite pigment can be used to enhance the properties of any material, but is particularly suited for use as a flatting agent in paints and as an anti-block agent for plastic film. The structured pigment of the invention also overcomes the drawback of calcined diatomaceous silica products by eliminating the crystalline silica without losing brightness or whiteness. The pigment is superior to the kaolin clay-based SAMS pigments by reason of its higher brightness. The inventive pigment is advantageous in that it can be employed as a drop-in substitute for a calcined diatomaceous silica type flatting agent (such as Celite® 281 flatting agent) or as a drop-in substitute for a calcined diatomaceous silica type anti-block agent (such as Super-floss® anti-block agent), without the need to reformulate the paint or film compositions.

DESCRIPTION OF THE PREFERRED EMBODIMENTS

Figure 1:
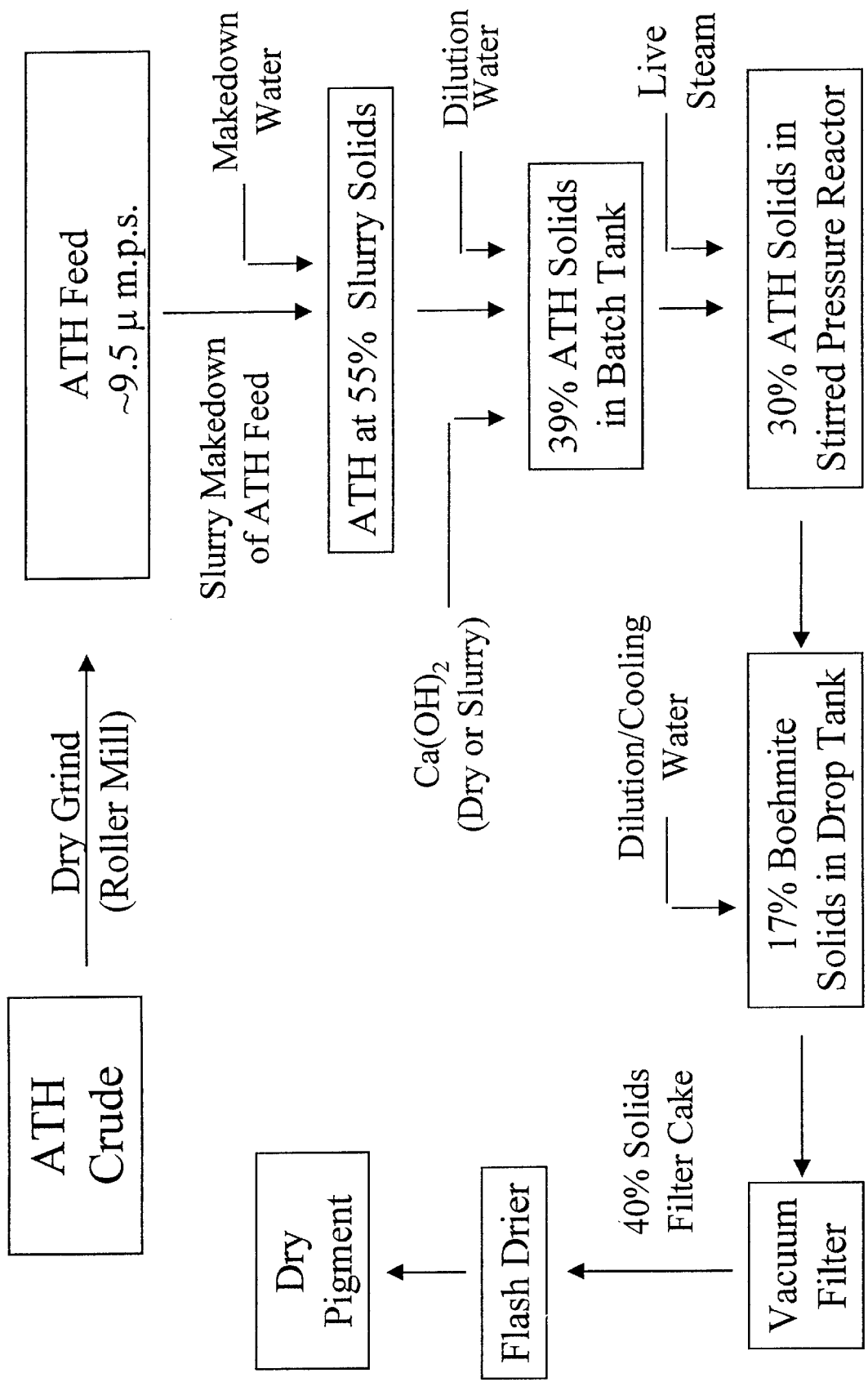
FIG. 1 is a schematic diagram showing a preferred method of making the boehmite flatting pigment of the present invention.

FIG. 1 illustrates an exemplary processing sequence to produce the inventive flatting and anti-block pigment. In the first step, an alumina trihydrate (gibbsite) crude is obtained and dry ground to form an alumina trihydrate feed. The dry grinding can be any conventional type, but roller milling is preferred. The alumina trihydrate crude can also be any type, but is preferably the mineral gibbsite.

The dry grinding process reduces the median particle size of the crude ATH material, generally about 40–60 microns, to a desirable size for further processing. The median particle size can vary depending on the end use of the product. However, a preferred range is about 8 to 12 microns with a more preferred range of about 9 to 10 microns for the dry ground product. A preferred alumina trihydrate feed product is available from J. M. Huber Corporation under the name Huber® SB432 alumina trihydrate and has a median particle size of about 9 microns.

Once the alumina trihydrate feed is ground to the desired particle size, an aqueous slurry is made with the addition of make-up water. As can be seen from FIG. 1, a preferred slurry solids percentage is 55 percent. Such a solids percent tends to inhibit pigment settling. However, the solids percent can vary, ranging from 30 to 70 percent, depending on the downstream conditions. Principally, the dry ground alumina trihydrate feed is slurried to facilitate the mixing occurring in the subsequent batch tank. In the batch tank, the alumina trihydrate slurry is combined with water and a base material. A preferred base material is an alkaline earth metal hydroxide such as calcium hydroxide, magnesium hydroxide, barium hydroxide, strontium hydroxide and the like. Calcium hydroxide, either in dry or slurry form, is added to the batch tank to form a target solids aluminum trihydrate reactor feed. A preferred ATH solids content in the reactor ranges between about 8 and 35 percent. The range of percent solids in the batch tank can also vary depending on the target solid contents needed in the downstream stirred pressure reactor.

Given that alumina trihydrate is chemically aluminum hydroxide, $Al(OH)_3$, the alkaline earth metal base concentration to be added is based on a mole percentage of the dry aluminum hydroxide being used in the reactor with the preferred concentrations being between 0.5 mole percent and 5.0 mole percent. Hereinafter the alkaline earth metal base mole percent (e.g., $Ca(OH)_2$) added to a hydrothermal reaction batch is calculated on a dry $Al(OH)_3$ molar basis. A portion of this base subsequently becomes a part of the final pigment composition. The portion of the base that becomes part of the final pigment composition may be in the form of a alkaline earth metal oxide, and the final pigment composition may contain about 0.1 wt % to about 3.5 wt % of an alkaline earth metal oxide. More importantly, the alkaline earth metal base addition contributes to the formation of the structured pigment in terms of increasing the aspect ratio of the platelets, the aggregate particle size and improving shear resistance of the structured pigment. It is also believed that the alkaline earth metal base promotes the hydrothermal conversion reaction of the alumina trihydrate (gibbsite) feedstock to the alumina monohydrate (boehmite) product. At levels less than about 0.5 mole % alkaline earth metal base, there is incomplete conversion of gibbsite to boehmite. At levels greater than about 5 mole % alkaline earth metal base, such as when the alkaline earth metal base is $Ca(OH)_2$, there is an undesirable partial conversion to katoite, $Ca_3Al_2(OH)_{12}$, in addition to boehmite.

The slurry of the alkaline earth metal base and the alumina trihydrate is then fed to a stirred pressure reactor and reacted at a target ATH solids content of about 30 percent. When using live steam to achieve the elevated pressure and temperature conditions, higher solids contents are targeted for the feed to the reactor to account for the dilution effect of the live steam addition. The stirred pressure reactor subjects the alumina trihydrate to conditions of elevated temperature and pressure to convert the alumina trihydrate to an alumina monohydrate. A preferred temperature range for conversion is between about 150° and 250° C., and more preferably 180° to 200° C. The pressure in the reactor is preferably from about 70 to about 580 psia.

The time in the pressure reactor is typically 45 minutes at 190° C., but can vary with temperature/pressure and the amount of the alumina trihydrate feed. Typical residence times at operating temperature in the reactor range from 20 to about 90 minutes. Generally, the residence time is that time necessary to convert the aluminum trihydrate to its monohydrate form. The solids within the stirred pressure reactor are also mixed to facilitate the conversion reaction. Higher mixing speeds are preferred over lower mixing speeds since they appear to produce a more stable and more attrition resistant structured product for post-reactor processing. Typical mixing speeds are detailed in the tables set forth below.

Once the alumina trihydrate (gibbsite) feed is converted, the reactor contents are transferred to a drop tank whereby the solids content is reduced by dilution/cooling water. A target solids content at this stage of the process is 17 percent, but other solid contents can be used, depending on the solids content of the material exiting the stirred pressure reactor. Generally, the solids content obtained in the drop tank will be less than that in the stirred pressure reactor due to the need for dilution and cooling water for subsequent filtering. The solids in the drop tank are then subjected to filtering and drying to produce a dry structured pigment. The filtering can be any type known in the art. Preferably, rotary vacuum filtering is utilized to produce a 40 percent solids filter cake. Likewise, the drying process can also vary as would be known in the art. Flash drying is preferred, but other types of drying can be utilized to produce the dry pigment. The dry pigment can then be packaged for subsequent application as a flatting pigment, an anti-block agent or other uses.

In order to demonstrate the method of making the structured boehmite pigment, the pigment's properties and its application in paint and polyolefin film formulations, a number of illustrative and comparative Examples and Tables follow. Example 1 follows the processing conditions specifically identified in FIG. 1. It should also be noted that Example 1 uses a pilot plant reactor with live-steam injection. This is in contrast to the method detailed in Example 2, which was conducted using laboratory reactor conditions. The laboratory reactor conditions differ from the pilot plant in that the batch, 2-gallon Parr reactor used in the laboratory is externally heated, whereas the pilot plant reactor is heated by the introduction of live steam. As a result of the live steam injection, the percent solids of the feed entering the pilot plant reactor is set at a higher level so that the subsequent water dilution obtained from the live steam addition yields the desired target reactor solids percent when the reaction batch has reached the final temperature/pressure conditions needed for hydrothermal conversion of the ATH (gibbsite). In contrast, the batch Parr reactor, being externally heated, can be fed with an ATH slurry based directly on the target solids percentage needed for the ensuing hydrothermal reaction. Unless otherwise stated in the following example descriptions or Tables the impeller mixing tip speeds employed in the pilot and the Parr lab reactors were 365 fpm and 250 fpm, respectively.

The physical and chemical data reported herein were determined as follows. Screen residue values for the structured boehmite products were measured by pouring a well-mixed slurry of the product through a 325 mesh screen, rinsing, drying and weighing the residue, following the ASTM D-185 procedure. Slurry pH values were determined using a standard pH meter on a specified product solids content in accordance with the ASTM D-1208, E-70 procedure. The dry pigment brightness values are standard TAPPI % brightness numbers as determined from sample plaque readings with a Technidyne Micro TB-1C brightness meter in accordance with the TAPPI Method T646 om-86 procedure. The median particle size values were measured by a laser light scattering (LLS) method and reported in microns. They were determined using a Malvern Mastersizer/E particle size instrument which is based on Fraunhofer diffraction theory as generally described in U.S. Pat. No. 5,167,707 and references cited therein. For median particle size with shearing determinations, 3.5 g sample and 50 g water were sheared in a Waring blender set to "low" speed for the indicated time (either 5 or 10 minutes). Thereafter, the median particle size was determined in the manner set forth above. BET surface areas were determined by the nitrogen absorption method described by Brunauer, Emett, and Teller in the "Journal of the American Chemical Society," Volume 60, page 309, published in 1938. A multi-point surface area determination was made on the boehmite test samples after outgassing them at 130° C. using a Micromeritics Gemini III 2375 instrument. Oil absorbance values were determined from the volume of linseed oil, in ml, absorbed per 100 grams of pigment by the rub-out method of ASTM-D.281. The specific crystal form(s) of hydrated alumina present in the various hydrothermal reaction products was determined by X-Ray Powder Diffraction analysis. Total and Differential Pore Volume values (TPV and DPV) for the dry pigments were determined by Mercury Intrusion Porosimetry using a Micromeritics AutoPore II 9220 unit. Total pore volume (in ml/g) was determined over an intrusion pressure range of 10–6,029 psia utilizing an advancing contact angle of 130 degrees, a surface tension of 485 dyne/cm and a pressure equilibration time of 10 seconds per intrusion measurement point. The DPV value quantifies the amount of porosity (in ml/g) present for pore diameter sizes ranging from 0.1–0.4 microns in size.

Evaluations in paint formulations were conducted in accordance with the following procedures:

Consistency according to ASTM D562-81

Directional Reflectance & CIELAB coordinates according to ASTM E1347-97 and E1164-94.

Contrast Ratio according to ASTM 2805-96a.

Sheen, 85°, and Gloss, 60°, according to ASTM D523-89.

Relative Tinting Strength and Tinted Y Value according to ASTM D823 and D2745-93.

Porosity according to ASTM D3258-80.

Scrub Resistance according to ASTM D2486-79.

Zahn Cup according to ASTM 4212-99

Framing is the tendency of a paint to show non-uniformity between adjacent painted areas applied with a paint roller and a brush. Touch-up is the tendency of a paint to show non-uniformity when a small area (spot) is touched-up with a brush over a surface of the same paint previously applied by roller. Waterspotting is the tendency of a dried paint film to show a discolored spot or streak when splashed with water. This discolored spot is still visible after the water has evaporated.

Framing, Touch-Up and Waterspotting evaluations are done in the listed sequence on the same test panels. For each test paint evaluation, cut dry-wall boards into about 2 square feet surface area test panels and tape the edges to prevent gypsum dust from damaging the test surface. Remove any dust and loose fibers from the panel surface with a clean lint-free cloth. Soak a 2 inch brush (nylon or polyester bristles for latex paints or natural bristle for solvent-based paints) for 15 minutes in clean water (latex paints) or paint solvent (solvent-based paints), then wipe the brush with a clean lint-free cloth to remove excess liquid. For the primer coat, completely cover a test panel with the test paint and allow to dry for 24 hours. Apply a 2 inch border or "frame" of the same test paint around the outside of the test panel with a pre-soaked 2 inch brush. Immediately apply a roll coat of test paint to the interior of the panel with a pre-dampened (water or solvent) 3–4 inch roller, slightly overlapping the 2 inch brushed frame. Allow the test panel to dry for 24 hours. Rate panels for framing by mounting them in a well lighted area in a vertical position about 10 feet from the observer and at eye level. Rate the panel for visual uniformity while standing directly in front of and about 10 feet from the panel. Remaining 10 feet from the panel, rate uniformity from different angles. Average the ratings of 3 observers. The rating scale is 0–10, with 10 being perfect. A rating of 0–5 indicates non-uniformity seen from "heads-on" observation, while a rating of 6–10 indicates uniformity from this observation point.

Touch-up is evaluated on the same panel used for framing. Apply a 2 inch wide track using a presoaked brush diagonally from corner to corner across the previously rolled interior of the test panel. Allow the panel to dry for at least 24 hours and then rate using the same scale and procedure as for framing.

Water spot resistance is evaluated on the same panel used for framing and touch-up. While the panel hangs vertically, trickle 1 ml of tap water along the top edge of the panel and allow it to run in a stream down the vertical length of the panel. Allow the panel to dry at least 24 hours and then rate using the same scale and procedure as for framing.

Solids by evaporation is determined gravimetrically. A 5 g (±0.001 g) specimen is weighed into a tared weighing dish and dried to constant weight at 105° C.

Brookfield viscosity is determined at 20 rpm with a RVT dial Brookfield Viscometer with a #1 spindle.

Evaluations in LDPE formulations for anti-block properties were conducted in accordance with the following procedures:

Blocking force was determined in accordance with ASTM D3354-89 utilizing a Kayeness block-reblock tester.

Haze or opacity was determined in accordance with ASTM D1003-97.

EXAMPLE 1

This example produces Sample B using a 1.08 mole % addition of calcium hydroxide and live steam. In contrast, Samples F, G, H and I of Example 2, as detailed below, use both sodium and calcium hydroxide in different weight percentages.

Sample B Processing 670 lbs. of ground alumina trihydrate, available from J. M. Huber Corporation, Edison, N.J. under the trademark Huber® SB-432 and having a median particle size of about 9.5 microns was mixed with 1048 lbs. of water followed by addition of about 7 lbs. of $Ca(OH)_2$. The resultant slurry was then pumped into a 300-Gallon stirred batch reactor. The reactor was then heated from room temperature to 190° C. (182 psia) in about 60 minutes by live steam injection. The reaction batch was then cooked at this temperature/pressure for 60 minutes. After cooking, the reactor was vented to a pressure of 30 psia before the bottom valve of the reactor was opened for blowing the product slurry out into a drop-tank. The drop tank had some cold dilution water to quench the product slurry with the resultant slurry solids becoming about 17%. This slurry was then filtered and flash-dried. The flash-dried product was deagglomerated by post pulverizing through a 0.062" screen for physical property characterizations and paint application studies. The process variables shown in FIG. 1 are representative of the processing steps used to produce Sample B. The physical properties of Sample B are summarized in Table 1 below.

EXAMPLE 2

Additional samples were generated (Samples F, G, H and I) using laboratory processing conditions for different additives and solids contents in a 2-gallon Parr reactor.

Sample F Processing 2500 g of a ground alumina trihydrate, available from J. M. Huber Corporation, Edison, N.J. under the trademark Huber® SB-432, of a median particle size of about 9.5 microns was mixed with 4642 g of water followed by addition of 74.2 g NaOH. The resultant slurry had a pH of 12.99 and a conductivity of 44,500 $\mu$S/cm. The slurry was then transferred into the 2-Gallon Parr batch reactor. The reaction batch was heated from room temperature to 190° C. (182 psia) in 80 minutes and subsequently cooked at that temperature/pressure for 60 minutes. After cooking, the reactor contents were cooled with water running through the cooling coil inside the reactor. It was found that the reaction product was caked to the coils and the mixing impeller due to its high viscosity. This indicated that the reaction needed to be carried out at lower solids, see Sample I below using ATH solids of 27% (instead of 35%) with a higher dosage of NaOH (7.78 mole % on a dry aluminum hydroxide basis). Nevertheless, the Sample F product slurry was unloaded and had a conductivity of 21,400 $\mu$S/cm and pH of 12.70. The slurry was then filtered, washed, and oven-dried. The dried product was deagglomerated by post pulverizing through a 0.062" screen for physical property characterizations and paint application studies.

Sample G Processing 5.13 mole % of calcium hydroxide (on a dry aluminum hydroxide basis) at 10% ATH solids was utilized to prepare Sample G. The same 9.5 micron ground alumina trihydrate, 700 g, was mixed with 6300 g of water followed by the addition of 35.91 g Ca(OH)$_2$. The resultant slurry had a pH of 12.63 and a conductivity of 8,360 $\mu$S/cm. Such slurry was then transferred into a 2-Gallon Parr batch reactor. The reaction batch was heated from room temperature to 190° C. (182 psia) and subsequently cooked there for 60 minutes. After cooking, the reactor was cooled with water running through the cooling coil inside the reactor. The product slurry was unloaded and had a conductivity of 2130 $\mu$S/cm and a pH of 11.55. This slurry was then filtered, washed, and oven-dried. The dried material was deagglomerated by post pulverizing through a 0.062" screen for its physical property characterizations and paint application studies.

Sample H Processing 0.90 mole % of calcium hydroxide (on a dry aluminum hydroxide basis) at 30% ATH solids was utilized to prepare Sample H. The same 9.5 micron ground alumina trihydrate, 2100 g, was mixed with 4900 g of water followed by the addition of 18.13 g Ca(OH)$_2$. The resultant slurry had a pH of 11.97 and a conductivity of 6060 $\mu$S/cm. The slurry was then transferred into a 2-Gallon Parr batch reactor. The reaction batch was heated from room temperature to 190° C. (182 psia) and cooked there for 60 minutes. After cooking, the reactor was cooled with water running through the cooling coil inside the reactor. The product slurry was unloaded and had a conductivity of 2820 $\mu$S/cm and a pH of 11.83. This slurry was then filtered, washed, and oven-dried. The dried material was deagglomerated by post pulverizing through a 0.062" screen for its physical property characterizations and paint application studies.

Sample I Processing

Finally, 7.78 mole % of sodium hydroxide at 27% ATH solids was utilized to prepare Sample I. Since preparation of Sample F had caused caking in the Parr reactor, Sample I was prepared at lower solids and a higher dosage of NaOH. The same ground alumina trihydrate of a median particle size of about 9.5 microns, 1890 g, was mixed with 5110 g of water followed by addition of 81.76 g NaOH. The resultant slurry had a pH of 13.06 and a conductivity of 53,800 $\mu$S/cm. The slurry was then transferred into a 2-Gallon Parr batch reactor. The reaction batch was heated from room temperature to 190° C. (182 psia) in 80 minutes and then cooked at such temperature for 60 minutes. After cooking, the reactor was cooled with water running through the cooling coil inside the reactor. The product slurry was unloaded and a conductivity of 30,000 $\mu$S/cm and a pH of 12.67 was observed. The slurry was then filtered, washed, and oven-dried. The dried product was deagglomerated by post pulverizing through a 0.062" screen for physical property characterizations and paint application studies.

Figure 2:
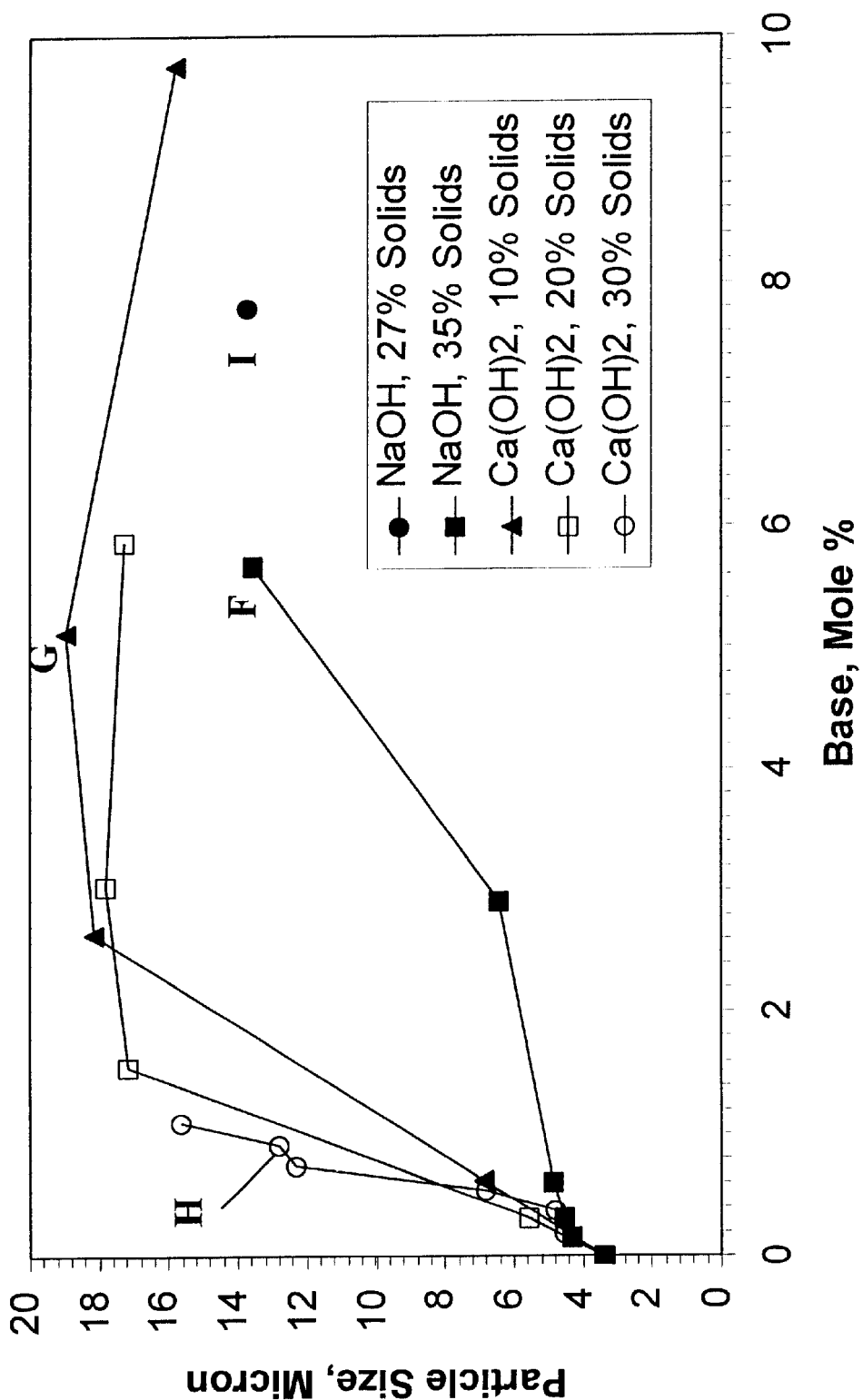
FIG. 2 is a graphical representation showing the effect of the base, mole % used in the reaction process on the resultant structured boehmite's median particle size.

In conjunction with Samples B, F, G, H and I described above, and additional test work using calcium hydroxide additions at 20 percent ATH solids, graphs comparing the base addition mole % to various product pigment properties were generated as FIGS. 2–5. FIG. 2 compares the structured boehmite product's median particle size in microns to the base mole % used in the reaction process for both sodium and calcium hydroxides at various addition levels. FIG. 2 and the subsequent figures also identify the specific values determined for Samples F, G. H and I. In other words, the value for Sample F as shown in the figures was derived from the processing explained above for this sample. FIG. 2 demonstrates that the addition of calcium hydroxide produces a coarser particle size reaction product than the sodium hydroxide and that lower levels of calcium hydroxide can be used to attain equivalent particle sizes. When comparing Samples I and H (NaOH vs. Ca(OH)$_2$), almost 8 mole % sodium hydroxide is needed to achieve a product particle size similar to Sample H, that uses less than 1.0 mole %. The reduction in the base amount when using an alkaline earth metal base is significant when considering the overall processing of the inventive pigment. Referring to Sample I, the product slurry had a conductivity of 30,000 $\mu$S/cm. With this conductivity, extensive washing must be conducted to remove the sodium hydroxide from the product so that it is acceptable for use in a subsequent application such as a paint formulation. In contrast, the conductivity of Sample H was only 2820 $\mu$S/cm. Using lower levels of calcium hydroxide avoids the requirement of excessive washing once the alumina trihydrate is converted to its monohydrate (boehmite) form.

Figure 3:
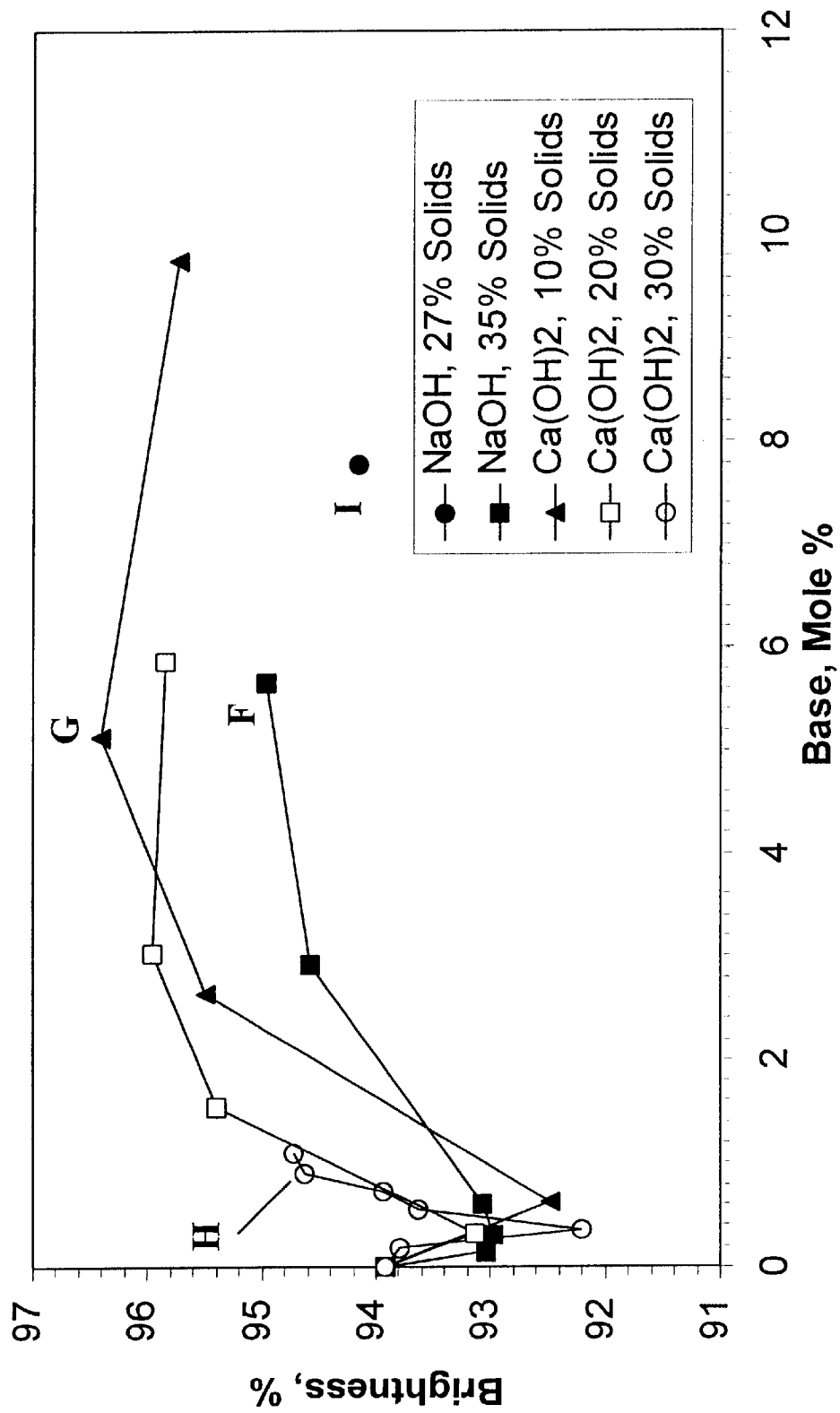
FIG. 3 is a graphical representation showing the effect of the base, mole % used in the reaction process on the brightness of the resultant structured boehmite.

FIG. 3 uses the same processing variables but compares percent pigment brightness to base mole % used in the hydrothermal reaction process. Comparing Sample H to Sample I, the pigment using the alkaline earth metal base results in better brightness, in spite of nearly one-eighth the base addition. FIG. 3 also implies that lower ATH solids in the reactor are preferred if ultra-high pigment brightness is a desired condition.

Figure 4:
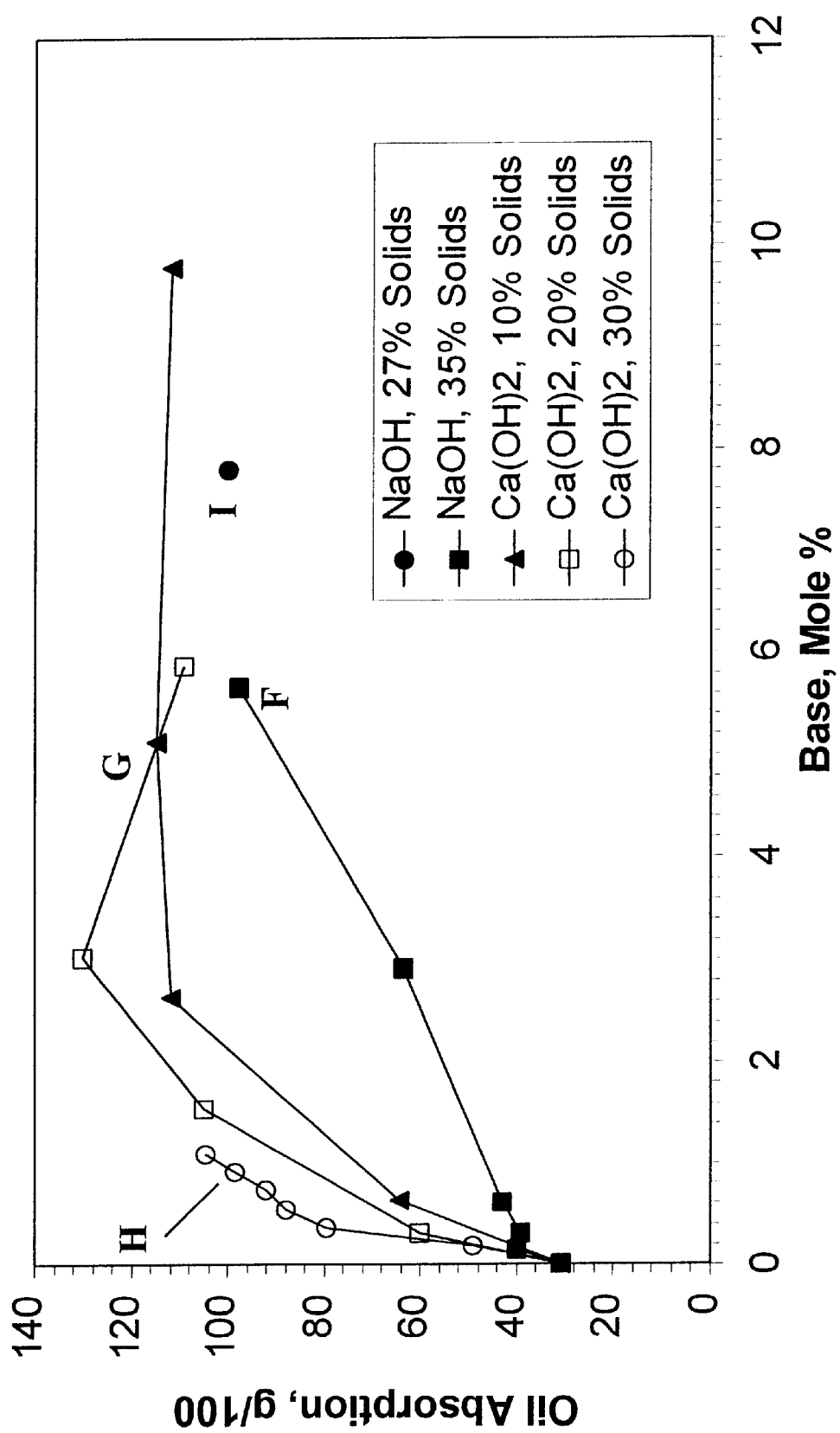
FIG. 4 is a graphical representation showing the effect of the base, mole % used in the reaction process on the oil absorption of the resultant structured boehmite.

FIG. 4 compares the oil absorption value of the reaction product obtained versus the base Mole % used in the hydrothermal process. This figure demonstrates that the product structure is similar, regardless of the base used. However, the equivalent structure level is obtained using nearly eight times less base when the base is an alkaline earth metal type. FIG. 4 also shows that higher solids contents will tend to produce more structure (higher oil absorption values), if such is desired in the end product pigment.

Figure 5:
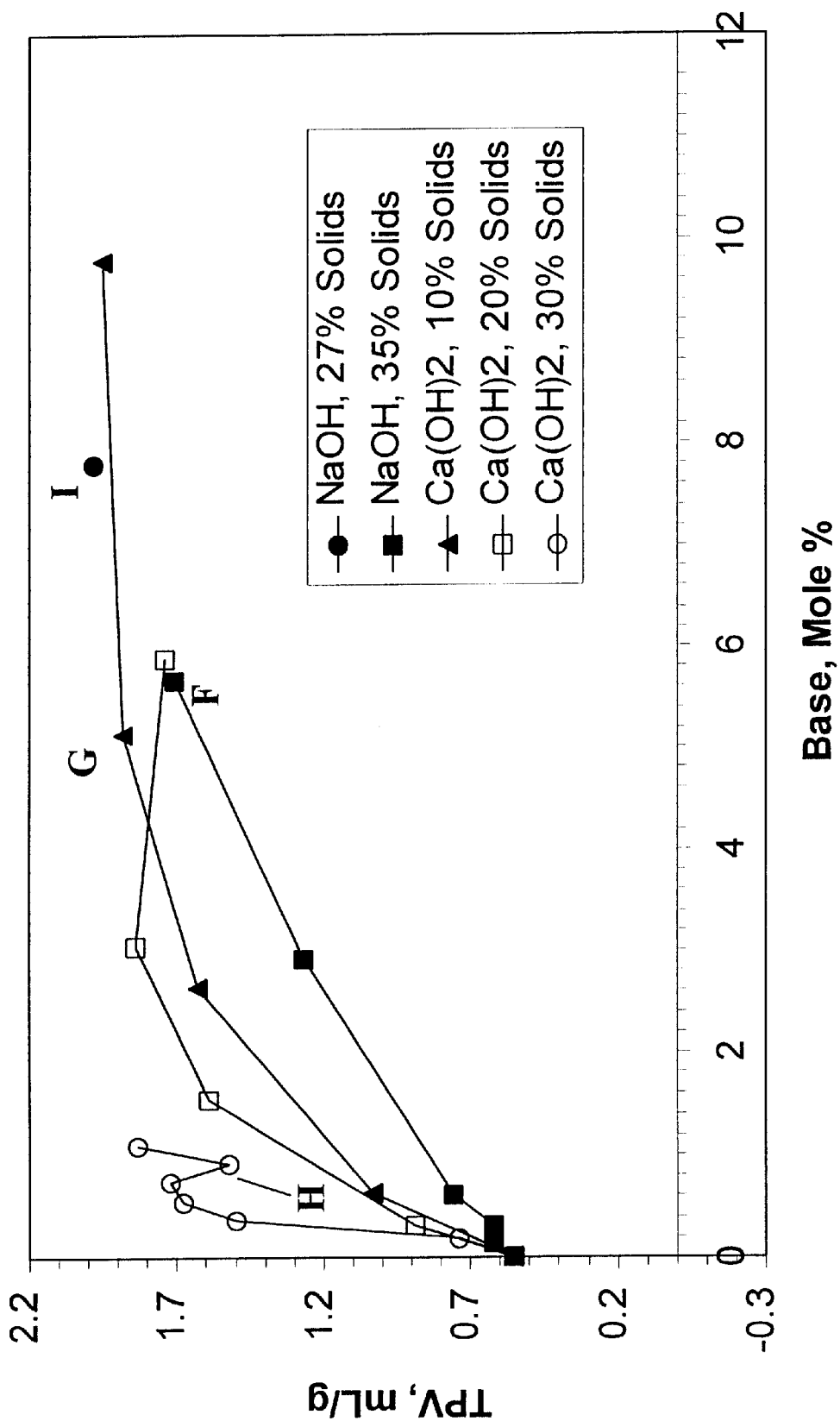
FIG. 5 is a graphical representation showing the effect of the base, mole % used in the reaction process on the total pore volume of the resultant structured boehmite.

FIG. 5 compares the reaction product's porosity or total pore volume (TPV) with base Mole % used in the hydrothermal process. Again, acceptable levels of porosity are achieved with the calcium hydroxide based product as opposed to the sodium hydroxide based product. Moreover, the level of calcium hydroxide is a lot lower to achieve a similar level of porosity at 30% solids, as compared to that of sodium hydroxide at 35% solids. Generally, higher levels of the calcium hydroxide are needed in the reaction process at lower ATH solids contents to get TPV porosity levels above 1.3 ml/g.

Figure 6:
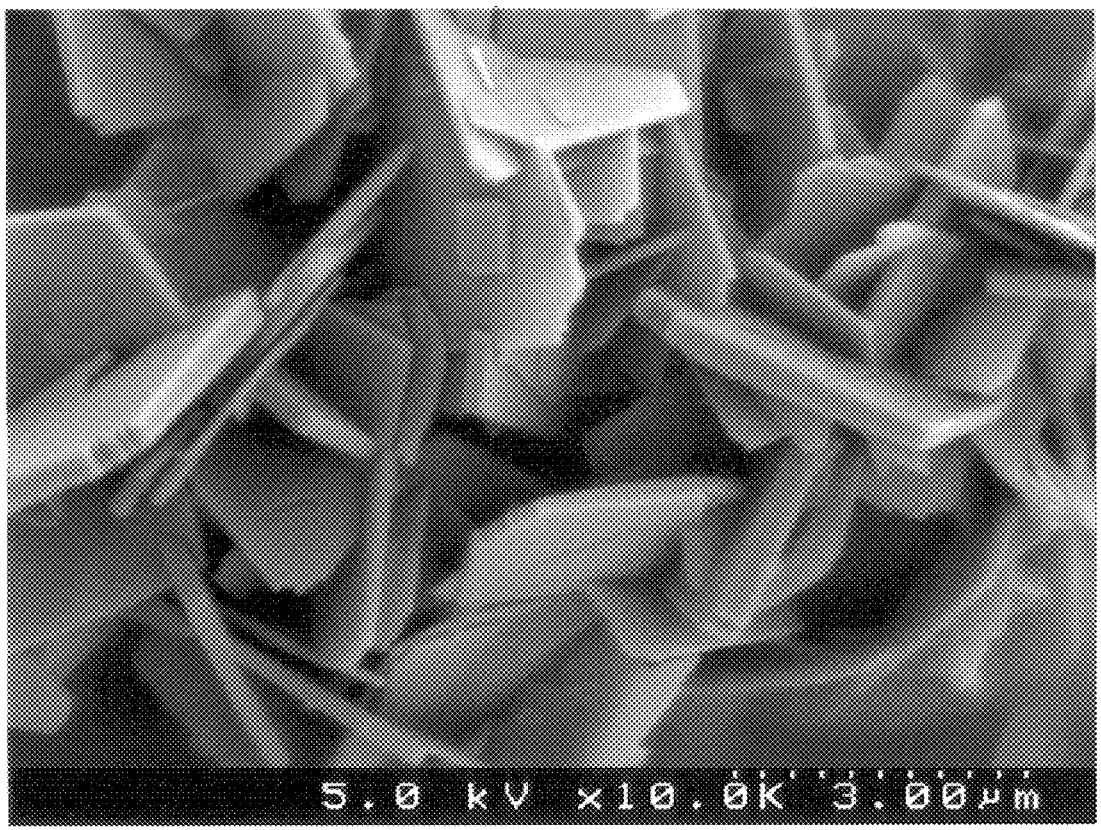
FIG. 6 is a SEM photograph of Boehmite Sample I.
Figure 7:
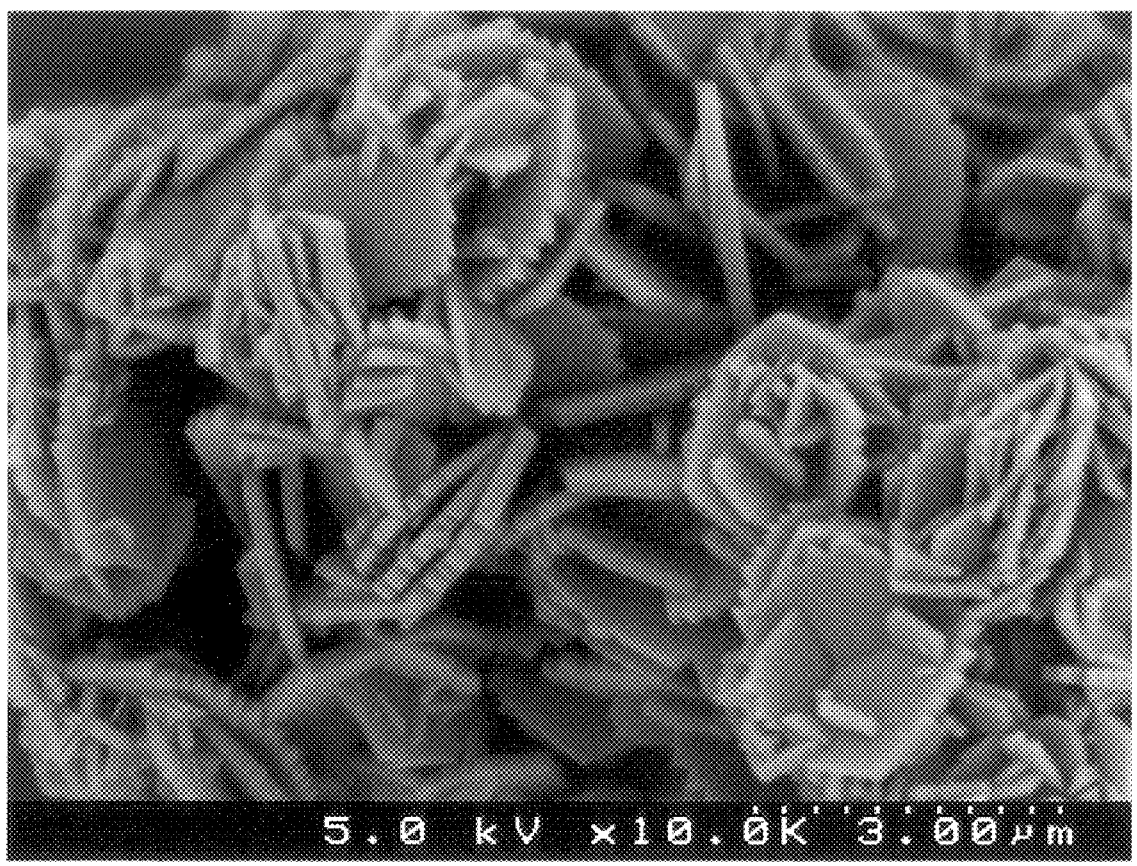
FIG. 7 is a SEM photograph of Boehmite Sample H.

FIGS. 6 and 7 show the particle morphology and structure of Samples I and H, respectively. As is evident from a comparison of these two electron micrographs, the hydrothermal reaction process using calcium hydroxide with ATH produces significantly more irregular shaped platelets of boehmite, particularly at the peripheral edges. The platelets of boehmite can be described as having serrated edges when calcium hydroxide was used as the base. The increased irregularity of Sample H over Sample I is desired since these irregular shapes cause more diffuse scattering of light, thereby improving paint flatting properties. This desirable result correlates with the irregularity typically found in the calcined diatomaceous earth flatting agents known in the prior art. The micro-roughness that these flatting agents attribute to the paint film when applied enhances the flatting performance. Thus, the increased irregularity of Sample H leads to better flatting performance than Sample I. The increased irregularity associated with Sample H is also beneficial to the inventive boehmite's anti-block performance in polyolefin film as the irregular shaped particles impart micro-roughness to the surface of the plastic film.

Various data was tabulated (Tables 1–4) to demonstrate the improvements associated with the inventive boehmite pigment and its method of making. Table 1 shows the effects of the alumina trihydrate feed particle size on the final physical properties of the as-produced boehmite pigment. The process of Example 1 was followed for Samples A to E with only the ATH feed particle size and calcium hydroxide addition levels varied. Reactor mixing speed was held constant within this hydrothermal reaction series. An impeller tip speed of 365 fpm was utilized. Moreover, Sample B in Table 1 corresponds to Sample B of Example 1. Table 1 shows that Sample A, with a ATH feed particle size of about 3 microns, did not produce the desired product median particle size of 10–15 microns. Table 1 also illustrates that a coarser ATH feed particle size may tend to produce a less shear-resistant pigment (see Sample E). Shear resistance can be an important pigment performance feature to paint formulators adding a flatting agent so as to predictably reduce sheen and gloss values from one paint batch to another. Furthermore, Table 1 shows that the resultant TAPPI brightness of the inventive boehmite pigments can be about 96–97%. This is a significant improvement in brightness level relative to the SAMS based flatting pigments previously described in U.S. Pat. No. 5,167,707. Although the SAMS pigments described there also offer a very low crystalline silica content (<0.03% by wt.) they typically only have a TAPPI brightness value of about 90%.

TABLE 1

Effects of ATH Feedstock on the Properties of Boehmite

| Reactor Experiment | A | B | C | D | E |
|---|---|---|---|---|---|
| ATH Feed Particle Size, μm | 3.02 | 9.56 | 9.91 | 11.09 | 11.50 |
| ATH Feed Brightness, % | 95.83 | 91.88 | 92.14 | 96.21 | 91.88 |
| Ca(OH)$_2$ Addition, Mole %* | 3.64 | 1.08 | 1.08 | 1.08 | 1.08 |
| ATH Feed Solids, % | 30 | 30 | 30 | 30 | 30 |
| Pilot Reactor Stirring Speed, fpm | 365 | 365 | 365 | 365 | 365 |
| Reaction Temperature**, °C. | 190 | 190 | 190 | 190 | 190 |
| Reaction Time, Minutes | 60 | 60 | 60 | 60 | 60 |
| Product Particle Size after Shear for 10 Sec., μm | — | 12.57 | 14.58 | 11.34 | 13.51 |
| Product Particle Size after Shear for 5 Min., μm | — | 12.47 | 13.18 | 11.12 | 11.28 |
| Product Particle Size after Shear for 10 Min., μm | 4.30 | 11.96 | 11.61 | 10.88 | 9.75 |
| Product Brightness, % | 97.15 | 96.00 | 95.97 | 97.35 | 95.58 |
| Product BET Surface Area, m$^2$/g | 13.8 | 14.1 | 6.6 | 14.5 | 5.4 |
| Product Residue (+325 Mesh), % | 0.0000 | 0.008 | 0.0166 | 0.0037 | 0.026 |

*The Mole % of Ca(OH)$_2$ added to a hydrothermal reaction batch is calculated on a dry Al(OH)$_3$ molar basis.
**A reaction temperature of 190° C. correlates to an operating pressure of 182 psia.

Table 2 demonstrates the effects derived from different base additions. Sample J used no base, while Sample K used sodium hydroxide (an alkali metal-containing component), and Samples L and M both used an alkaline earth metal base. Table 2 demonstrates that using sodium hydroxide or no base at all results in an unacceptable product particle size and particles sensitive to attrition. Table 2 also shows that alkaline earth metal hydroxides other than calcium hydroxide can be used to produce the desired boehmite pigment.

TABLE 2

Boehmites Produced from Different Combinations of ATH and Base

| Reactor Experiment | J | K | L | M |
|---|---|---|---|---|
| ATH Feed | SB-432 | SB-432 | SB-432 | SB-432 |
| ATH Feed Particle Size, μm | 9.56 | 9.56 | 9.56 | 9.56 |
| Base Type | None | NaOH | Ca(OH)$_2$ | Ba(OH)$_2$ |
| Base Addition, Mole %** | — | 3.00 | 1.09 | 1.56 |
| ATH Feed Solids, % | 35 | 35 | 30 | 20 |
| Parr's Stirring Speed, fpm | 250 | 250 | 250 | 250 |
| Reaction Temperature, °C. | 190 | 190 | 190 | 190 |
| Reaction Time, Minutes | 60 | 60 | 60 | 60 |
| Product Particle Size after Shear for 10 Sec., μm | 5.85 | 9.15 | 18.38 | 21.26 |
| Product Particle Size after Shear for 5 Min., μm | 3.79 | 7.22 | 15.14 | 14.69 |
| Product Particle Size after Shear for 10 Min., μm | 3.50 | 6.62 | 13.16 | 12.06 |
| Product Residue (+325 Mesh), % | 0.0063 | 0.0205 | 0.3002 | 0.0465 |
| Product BET Surface Area, m$^2$/g | 1.38 | 3.02 | 5.97 | 7.94 |
| Product DPV, mL/g | 0.0121 | 0.0261 | 0.0908 | 0.1609 |
| Product TPV, mL/g | 0.5476 | 1.2713 | 1.8322 | 2.0673 |

**The Mole % of base added to a hydrothermal reaction batch is calculated on a dry Al(OH)$_3$ molar basis.

Table 3 compares different levels of calcium hydroxide addition, from 0.0 mole % up to 0.72 %. Comparing Samples N, O and P, the lack of a base addition resulted in incomplete hydrothermal conversion of the feed, i.e., gibbsite, to the product pigment, boehmite, when subjected to the listed reactor conditions. Incomplete conversion was determined by subjecting the reaction product to powder X-Ray Diffraction (XRD) analysis. The relative weight ratio of gibbsite to boehmite present in Sample N was calculated from a comparison of relative XRD peak intensities. This table also shows that 0.15 mole % calcium hydroxide caused complete hydrothermal conversion (as no gibbsite was detected via XRD analysis) but the product's particle size was inadequate. Using 0.72 mole % calcium hydroxide resulted in both conversion to boehmite and a desired median particle size. Table 3 demonstrates that an effective amount of calcium hydroxide or other alkaline earth metal base is believed to be necessary to achieve both the desired particle size range described above as well as complete conversion of the alumina trihydrate to its monohydrate form. A preferred range of alkaline earth metal base (calcium hydroxide) is from about 0.5 to about 5.0 mole %. However, lower levels of calcium hydroxide could also be used providing that the conversion to boehmite is complete and desired particle size is attained after processing.

TABLE 3

Boehmites Produced from Different Dosages of Ca(OH)₂

| Reactor Experiment | N | O | P |
|---|---|---|---|
| ATH Feed | SB-432 | SB-432 | SB-432 |
| ATH Feed Particle Size, μm | 9.56 | 9.56 | 9.56 |
| Base Type | None | Ca(OH)₂ | Ca(OH)₂ |
| Base Addition, Mole %** | — | 0.15 | 0.72 |
| Parr's Stirring Speed, fpm | 250 | 250 | 250 |
| Reaction Temperature, °C. | 190 | 190 | 190 |
| Reaction Time, Minutes | 60 | 60 | 60 |
| Product Particle Size after Shear for 10 Sec., μm | 5.85 | 6.86 | 17.56 |
| Product Particle Size after Shear for 5 Min., μm | 3.79 | 4.83 | 13.77 |
| Product Particle Size after Shear for 10 Min., μm | 3.50 | 4.47 | 12.15 |
| Product Residue (+325 Mesh), % | 0.0063 | 0.0115 | 0.0348 |
| Product Composition: Weight Ratio of Gibbsite to Boehmite | 67/33 | 0/100 | 0/100 |
| Product Total Pore Volume, ml/g | 0.5476 | 0.7587 | 1.2712 |
| DPV, mL/g | 0.0121 | 0.0100 | 0.0770 |
| Product BET Surface Area, m²/g | 1.38 | 2.34 | 4.95 |

**The Mole % of Ca(OH)₂ added to a hydrothermal reaction batch is calculated on a dry Al(OH)₃ molar basis.

Table 4 shows the effect of reactor mixing speeds on the product's particle size. Sample Q shows that a lower mixing speed results in a more attrition-sensitive product. Higher mixing speeds in the reactor tend to produce both finer particle size products and more shear stable particle sizes. As previously discussed, shear stability is an important property of flatting agents since paint formulators use high speed mixing when producing the paint.

TABLE 4

Boehmites Produced at Different Reactor Mixing Speeds

| Reactor Experiment | Q | R | S | T |
|---|---|---|---|---|
| ATH Feed | SB-432 | SB-432 | SB-432 | SB-432 |
| ATH Feed Particle Size, μm | 9.56 | 9.56 | 9.56 | 9.56 |
| Ca(OH)₂ Addition, Mole %** | 0.91 | 0.91 | 0.91 | 0.91 |
| Parr's Stirring Speed, fpm | 125 | 250 | 375 | 500 |
| ATH Feed Solids, % | 30 | 30 | 30 | 30 |
| Reaction Temperature, °C. | 190 | 190 | 190 | 190 |
| Reaction Time, Minutes | 60 | 60 | 60 | 60 |
| Product Particle Size after Shear for 10 Sec., μm | 25.31 | 18.71 | 14.27 | 11.01 |
| Product Particle Size after Shear for 5 Min., μm | 13.91 | 13.91 | 12.68 | 10.27 |
| Product Particle Size after Shear for 10 Min., μm | 9.11 | 11.55 | 11.73 | 9.74 |
| Product Residue (+325 Mesh), % | 0.0320 | 0.0619 | 0.0242 | 0.2952 |
| Product BET Surface Area, m²/g | 3.80 | 4.63 | 5.99 | 6.45 |
| Product DPV, mL/g | 0.0546 | 0.0657 | 0.0884 | 0.0850 |
| Product Total Pore Volume, m²/g | 1.4991 | 1.5117 | 1.5468 | 1.4770 |

**The Mole % of Ca(OH)₂ added to a hydrothermal reaction batch is calculated on a dry Al(OH)₃ molar basis.

Various calcium hydroxide promoted, boehmite reaction products produced by hydrothermal means in accordance with the data presented in FIG. 2 were subsequently analyzed for their final CaO content on a Wt. % basis. Details concerning the reaction conditions, the amount of calcium hydroxide base added to each reaction batch and the resultant amount of CaO present in the finished boehmite products are summarized in Table 5 below. Based on this data, the amount of CaO present in the finished boehmite products of this invention typically ranges from about 0.10% to about 3.5% by weight of the total pigment composition. Given the boehmite crystal form, as determined from x-ray powder diffraction, and the above CaO contents then generic oxide formulas can also be calculated and stoichiometrically expressed as follows:

$$xCaO:Al_2O_3:H_2O$$

wherein the numeric value of x can range from about 0.002 to about 0.08 for the products of this invention.

TABLE 5

CaO Content of Various Boehmite Reaction Products

| Test Sample | Reaction Solids | Ca(OH)₂ Addition, Mole %** | CaO Content in Final Product, Wt. % | % CaO Retained | Final Product Composition (Expressed as an Oxide Formula) |
|---|---|---|---|---|---|
| From FIG. 2 Expts | 20% | 0.31 | 0.04 | 14.0 | 0.0004CaO:Al₂O₃:H₂O |
| From FIG. 2 Expts | 10% | 0.62 | 0.22 | 37.5 | 0.0046CaO:Al₂O₃:H₂O |
| From FIG. 2 Expts (Sample H) | 30% | 0.90 | 0.26 | 30.8 | 0.0056CaO:Al₂O₃:H₂O |
| From FIG. 2 Expts | 20% | 1.54 | 0.24 | 17.0 | 0.0052CaO:Al₂O₃:H₂O |
| From FIG. 2 Expts | 10% | 2.63 | 1.07 | 43.4 | 0.023CaO:Al₂O₃:H₂O |

TABLE 5-continued

CaO Content of Various Boehmite Reaction Products

| Test Sample | Reaction Solids | Ca(OH)$_2$ Addition, Mole %** | CaO Content in Final Product, Wt. % | % CaO Retained | Final Product Composition (Expressed as an Oxide Formula) |
|---|---|---|---|---|---|
| From FIG. 2 Expts | 20% | 3.03 | 1.58 | 37.3 | 0.022CaO:Al$_2$O$_3$:H$_2$O |
| From FIG. 2 Expts (Sample G) | 10% | 5.13 | 3.40 | 70.9 | 0.076CaO:Al$_2$O$_3$:H$_2$O |

(All reactions were conducted @ 190° C. for 1 Hr.)
**The Mole % of Ca(OH)$_2$ added to a hydrothermal reaction batch is calculated on a dry Al(OH)$_3$ molar basis.

To show the benefit of the inventive boehmite pigment as a substitute for diatomaceous silica products, paint studies were conducted using the three different paint formulations. Tables 6A, 6B, 7 and 8 relate to this comparative test work between prior art flatting agents and the inventive pigment used as a flatting agent.

Tables 6A and 6B compare a prior art flatting agent, Celite® 281, to Samples I, G and H. Sample I uses sodium hydroxide with Samples G and H using different mole percentages of calcium hydroxide and different levels of ATH solids in their production. The latex paint formulation used in Table 6A had a 60% P.V.C. (Pigment Volume Concentration), typically known as a medium P.V.C. formulation. Referring to Table 6B, specifically the sheen properties, Samples G and H show significantly lower sheen values, both at the 3 mil and 12 mil thicknesses. The sheen values of the boehmite products made with an alkaline earth metal base clearly demonstrate that the inventive pigment can be used as a substitute for the Celite® 281 flatting agent without loss of flatting properties. In addition, and as importantly, Samples G and H compare similarly to the other properties of Celite® 281, e.g., directional reflectance, gloss, etc. This shows that the inventive pigment can be readily used to merely replace the undesirable Celite 281® without change in the overall properties of the paint formulation. Consequently, a paint formulator can readily use the inventive pigment as a flatting agent in total substitution for the Celite 281® flatting agent without modifying the paint formulation.

TABLE 6A

Evaluation of Boehmite Flatting Agents in an Interior Latex Flat Paint: Paint Formulation

| | PRIMARY PIGMENT | | | |
|---|---|---|---|---|
| | Tronox CR-828 | Tronox CR-828 | Tronox CR-828 | Tronox CR-828 |
| | EXTENDER PIGMENT | | | |
| RESIN | Celite 281 (Control) Rovace 9165 | Boehmite Sample I Rovace 9165 | Boehmite Sample G Rovace 9165 | Boehmite Sample H Rovace 9165 |
| INGREDIENTS GRIND: | Pounds/100 Gallons | | | |
| Water | 250.20 | 250.20 | 250.20 | 250.20 |
| Ethylene Glycol | 27.75 | 27.75 | 27.75 | 27.75 |
| Cellosize QP-15000 | 6.00 | 6.00 | 6.00 | 6.00 |
| Colloid 226 | 5.25 | 5.25 | 5.25 | 5.25 |
| AMP-95 | 1.96 | 1.96 | 1.96 | 1.96 |
| Colloid 643 | 1.75 | 1.75 | 1.75 | 1.75 |
| Nuosept 95 | 2.05 | 2.05 | 2.05 | 2.05 |
| Tronox CR-828 | 150.00 | 150.00 | 150.00 | 150.00 |
| Huber 70C | 152.50 | 152.50 | 152.50 | 152.50 |
| Hubercarb Q-4 | 9.24 | 21.43 | 21.43 | 21.43 |
| Celite 281 | 50.00 | | | |
| BOEHMITE Sample I | | 50.00 | | |
| BOEHMITE Sample G | | | 50.00 | |
| BOEHMITE Sample H | | | | 50.00 |
| Disperse the above at high speed for 10 minutes. Add the ingredients below and mix for 15 minutes at low speed. LETDOWN: | | | | |
| Water | 279.36 | 279.36 | 279.36 | 279.36 |
| Cellosize QP-15000 | 2.00 | 2.00 | 2.00 | 2.00 |
| AMP-95 | 0.98 | 0.98 | 0.98 | 0.98 |
| Texanol | 5.92 | 5.92 | 5.92 | 5.92 |
| Rovace 9165 | 146.92 | 146.92 | 146.92 | 146.92 |
| TOTALS: | 1091.88 | 1113.31 | 1113.31 | 1113.31 |

TABLE 6A-continued

Evaluation of Boehmite Flatting Agents in an Interior Latex Flat Paint: Paint Formulation

| | PRIMARY PIGMENT | | | |
|---|---|---|---|---|
| | Tronox CR-828 | Tronox CR-828 | Tronox CR-828 | Tronox CR-828 |
| | EXTENDER PIGMENT | | | |
| | Celite 281 (Control) | Boehmite Sample I | Boehmite Sample G | Boehmite Sample H |
| RESIN | Rovace 9165 | Rovace 9165 | Rovace 9165 | Rovace 9165 |
| CALCULATED VALUES: | | | | |
| Solids by weight, % | 43.10 | 44.19 | 44.19 | 44.19 |
| Solids by volume, % | 25.74 | 25.74 | 25.74 | 25.74 |
| P.V.C., % | 60.00 | 60.00 | 60.00 | 60.00 |

Cellosize ®QP-15000 thickener is available from Union Carbide
Colloid 226 dispersant is available from Vinings Corporation
AMP ®95 pH buffer is available from Angus
Colloid 643 defoamer is available from Vinings corporation
Nuosept ® 95 biocide is available from Huls America, Inc.
Tronox CR-828 $TiO_2$ is available from Kerr McGee Chemical LLC
Huber ®70C calcined clay is available from J. M. Huber Corp.
Hubercarb ® Q-4 $CaCO_3$ is available from J. M. Huber Corp.
Texanol is 2,2,4-trimethyl-1,3-pentanediol monoisobutyrole is available from Aldrich Chemical
Rovace ® 9165 resin is available from Rohm and Haas

TABLE 6B

Evaluation of Boehmite Flatting Agents in an Interior Latex Flat Paint: Paint Performance Data.

| | PRIMARY PIGMENT | | | |
|---|---|---|---|---|
| | Tronox CR-828 | Tronox CR-828 | Tronox CR-828 | Tronox CR-828 |
| | EXTENDER PIGMENT | | | |
| | Celite 281 (Control) | Boehmite Sample I | Boehmite Sample G | Boehmite Sample H |
| RESIN | Rovace 9165 | Rovace 9165 | Rovace 9165 | Rovace 9165 |
| PERFORMANCE DATA: | | | | |
| Solids by Evaporation, % | 42.98 | 44.12 | 44.22 | 44.24 |
| Consistency, Krebs Units | 93 | 94 | 97 | 93 |
| PH | 9.36 | 9.28 | 9.52 | 9.25 |
| Optical Properties with 3 mil bird blade | | | | |
| Directional Reflectance, Y Value | 91.80 | 91.97 | 91.93 | 91.82 |
| CIELAB Coordinates: | | | | |
| L | 96.74 | 96.81 | 96.79 | 96.75 |
| A | −0.72 | −0.71 | −0.72 | −0.72 |
| B | 1.81 | 1.82 | 1.88 | 1.86 |
| Contrast Ratio | 0.977 | 0.983 | 0.979 | 0.978 |
| Sheen, 85 degree | 1.5 | 1.5 | 1.0 | 1.3 |
| Gloss, 60 degree | 3.0 | 3.0 | 2.8 | 3.0 |
| Optical Properties with 12 mil bird blade | | | | |
| Directional Reflectance, Y Value | 93.04 | 93.35 | 93.25 | 93.19 |
| CIELAB Coordinates: | | | | |
| L | 97.24 | 97.37 | 97.33 | 97.31 |
| A | −0.58 | −0.53 | −0.56 | −0.53 |
| B | 2.67 | 2.73 | 2.68 | 2.79 |
| Contrast Ratio | 1.00 | 1.00 | 1.00 | 1.00 |
| Sheen, 85 degree | 1.9 | 1.9 | 1.2 | 1.7 |
| Gloss, 60 degree | 3.3 | 3.3 | 3.1 | 1.7 |
| Relative Tinting Strength, % | 0.0 | −1.9 | −1.4 | −5.2 |
| Tinted Y Value | 48.84 | 48.51 | 48.6 | 47.94 |
| Porosity, % | 86.17 | 83.56 | 83.50 | 85.56 |
| Scrub Resistance, brush cycles | 85 | 80 | 78 | 78 |
| Touch up | 6 | 3 | 2 | 3 |

TABLE 6B-continued

Evaluation of Boehmite Flatting Agents in an Interior Latex Flat Paint: Paint Performance Data.

| | PRIMARY PIGMENT | | | |
|---|---|---|---|---|
| | Tronox CR-828 | Tronox CR-828 | Tronox CR-828 | Tronox CR-828 |
| | EXTENDER PIGMENT | | | |
| | Celite 281 (Control) | Boehmite Sample I | Boehmite Sample G | Boehmite Sample H |
| RESIN | Rovace 9165 | Rovace 9165 | Rovace 9165 | Rovace 9165 |
| Framing | 7 | 4 | 5 | 7 |
| Waterspotting | 6 | 8 | 6 | 8 |

Table 7 shows paint results similar to that shown in Table 6B, but employs a high P.V.C. paint formulation typically used for ceiling tile coating. Again, the sheen values for Sample H are superior to that of the Celite® 281 flatting agent containing formulation. In addition, the directional reflectance property is improved for Sample H, indicating that even better optical properties are achieved when using the inventive pigment as a flatting agent rather than Celite® 281 flatting agent.

TABLE 7

Evaluation of Boehmite Flatting Agents in High PVC Ceiling Tile Coating

| | FLATTING PIGMENT | | |
|---|---|---|---|
| | Celite 281 | Boehmite Sample I | Boehmite Sample H |
| | EXTENDER PIGMENT | | |
| | Minex 7 Polyplate P Airflex 4530 | Minex 7 Polyplate P Airflex 4530 | Minex 7 Polyplate P Airflex 4530 |
| RESIN | Vinac 521BP | Vinac 521BP | Vinac 521BP |
| INGREDIENTS GRIND: | | | |
| Water | 300.00 | 300.00 | 300.00 |
| Colloid 643 | 3.00 | 3.00 | 3.00 |
| Burmocoll EBS 451FG | 0.80 | 0.80 | 0.80 |
| Ammonia | 0.30 | 0.30 | 0.30 |
| Nuosept 95 | 1.50 | 1.50 | 1.50 |
| KTPP | 0.80 | 0.80 | 0.80 |
| Minex 7 | 118.00 | 118.00 | 118.00 |
| Polyplate P | 246.17 | 258.50 | 258.50 |
| Celite 281 | 30.00 | | |
| Boehmite Sample I | | 30.00 | |
| Boehmite Sample H | | | 30.00 |

Disperse the above at high speed for 10 minutes. Add the Ingredients below. Mix at low speed for 15 minutes

LETDOWN

| | | | |
|---|---|---|---|
| Airflex 4530 | 20.50 | 20.50 | 20.50 |
| Vinac 521BP | 56.52 | 56.52 | 56.52 |
| Water | 301.70 | 301.70 | 301.70 |
| TOTALS: | 1079.29 | 1079.29 | 1079.29 |
| CALCULATED VALUES: | | | |
| P.V.C., % | 82.50 | 82.50 | 82.50 |
| PERFORMANCE DATA: | | | |
| Solids, % | 40.71 | 41.35 | 41.35 |
| Brookfield, 20 RPM, #1 Spindle | 85 | 87 | 90 |

TABLE 7-continued

Evaluation of Boehmite Flatting Agents in High PVC Ceiling Tile Coating

| | FLATTING PIGMENT | | |
|---|---|---|---|
| | Celite 281 | Boehmite Sample I | Boehmite Sample H |
| | EXTENDER PIGMENT | | |
| | Minex 7 Polyplate P Airflex 4530 | Minex 7 Polyplate P Airflex 4530 | Minex 7 Polyplate P Airflex 4530 |
| RESIN | Vinac 521BP | Vinac 521BP | Vinac 521BP |
| Zahn Cup, #2, Seconds | 18.8 | 18.8 | 18.8 |
| Directional Reflectance, Y Value** | 87.88 | 88.47 | 88.57 |
| Contrast Ratio* | 0.927 | 0.934 | 0.929 |
| Sheen, 85 degree* | 4.0 | 3.5 | 3.4 |
| Gloss, 60 degree* | 3.9 | 3.9 | 3.9 |
| Hunter Lab Color** | | | |
| L | 93.74 | 94.06 | 94.11 |
| A | −0.12 | −0.10 | −0.11 |
| B | 3.84 | 3.72 | 3.63 |

*Panels made using 0.003" Bird Bar
**Panels made using 0.012" Bird Bar
Colloid 643 defoamer is available from Vinings corporation
Burmocoll ® EBS 451FG cellulose is a thickener available from Berol Kemi AM of Sweden
Nuosept ®95 biocide is available from Huls America, Inc.
KTPP dispersant is available from FMC Corporation
Minex ®7 extender is available from Indusmin, Inc.
Polyplate ® P delaminated clay is available from J. M. Huber Corporation
Airflex ® 4530 resin is available from Air Products
Vinac ® 521 BP polyvinyl acetate resin is available from Air Products Table 8 compares Samples I and H to two calcined diatomaceous earth flatting agents, Celite 281 and Celite 499, and a non-calcined, fresh water silica flatting agent, Diafil 525. This evaluation was carried out in an exterior latex house paint, i.e., a lower P.V.C. percentage of 40%. Again, the sheen values for Samples I and H are demonstratively improved over the prior art flatting agents.

TABLE 8

Evaluation of Boehmite Flatting Agents in Exterior Latex House Paint

| RESIN | PRIMARY PIGMENT | | | | |
|---|---|---|---|---|---|
| | Tronox CR-828 | Tronox CR-828 | Tronox CR-828 | Tronox CR-828 | Tronox CR-828 |
| | EXTENDER PIGMENT | | | | |
| | Celite 281 Ucar 6379 | Celite 499 Ucar 6379 | Diafil 525 Ucar 6379 | Boehmite Sample I Ucar 6379 | Boehmite Sample H Ucar 6379 |
| INGREDIENTS GRIND: | | | | | |
| Water | 275.00 | 275.00 | 275.00 | 275.00 | 275.00 |
| Ethylene Glycol | 27.80 | 27.80 | 27.80 | 27.80 | 27.80 |
| Natrosol 250 MBR | 4.00 | 4.00 | 4.00 | 4.00 | 4.00 |
| AMP-95 | 2.00 | 2.00 | 2.00 | 2.00 | 2.00 |
| Nopcocide N-96 | 6.00 | 6.00 | 6.00 | 6.00 | 6.00 |
| Colloid 643 | 1.75 | 1.75 | 1.75 | 1.75 | 1.75 |
| Tamol 850-30 | 5.25 | 5.25 | 5.25 | 5.25 | 5.25 |
| KTPP | 1.00 | 1.00 | 1.00 | 1.00 | 1.00 |
| Triton N-101 | 2.15 | 2.15 | 2.15 | 2.15 | 2.15 |
| Tronox CR-828 | 225.00 | 225.00 | 225.00 | 225.00 | 225.00 |
| Polyplate P | 105.11 | 105.11 | 107.89 | 117.44 | 117.44 |
| Celite 281 | 30.00 | | | | |
| Celite 499 | | 30.00 | | | |
| Diafil 525 | | | 30.00 | | |
| Boehmite Sample I | | | | 30.00 | |
| Boehmite Sample H | | | | | 30.00 |
| Disperse the above at high speed for 10 minutes. Add the Ingredients below. Mix at low speed for 15 minutes | | | | | |
| LETDOWN | | | | | |
| Water | 72.04 | 72.04 | 72.04 | 72.04 | 72.04 |
| Ucar 6379 | 346.63 | 346.63 | 346.63 | 346.63 | 346.63 |
| AMP-95 | 1.00 | 1.00 | 1.00 | 1.00 | 1.00 |
| Texanol | 11.85 | 11.85 | 11.85 | 11.85 | 11.85 |
| TOTALS: | 1116.58 | 1116.58 | 1119.36 | 1128.91 | 1128.91 |
| CALCULATED VALUES: | | | | | |
| Solids by weight, % | 50.81 | 50.81 | 50.94 | 51.35 | 51.35 |
| Solids by volume, % | 34.36 | 34.36 | 34.36 | 34.36 | 34.36 |
| P.V.C., % | 40.00 | 40.00 | 40.00 | 40.00 | 40.00 |
| PERFORMANCE DATA: | | | | | |
| Solids by Evaporation, % | 50.95 | 51.12 | 50.93 | 51.60 | 51.70 |
| Consistency, Krebs Units | 78 | 78 | 80 | 79 | 78 |
| PH | 9.64 | 9.62 | 9.50 | 9.61 | 9.58 |
| Fineness of Grind, Hegman | 4.5 | 5.5 | 4.0 | 5.0 | 5.0 |
| 3 mil Drawdown Data | | | | | |
| Directional Reflectance, Y Value | 91.56 | 91.57 | 91.02 | 91.49 | 91.41 |
| Hunter Lab Coordinates: | | | | | |
| L | 95.69 | 95.69 | 95.4 | 95.65 | 95.61 |
| A | −0.89 | −0.89 | −0.8 | −0.88 | −0.88 |
| B | 1.79 | 1.76 | 1.91 | 1.85 | 1.81 |
| Contrast Ratio | 0.979 | 0.975 | 0.980 | 0.978 | 0.981 |
| Sheen, 85 degree | 8.8 | 10.0 | 8.2 | 4.2 | 4.3 |
| Gloss, 60 degree | 8.0 | 7.6 | 7.7 | 6.3 | 6.7 |

Tronox ® CR-828 $TiO_2$ is available from Kerr McGee Chemical LLC
Ucar ®6379 acrylic resin is available from Union Carbide
Natrosol ® 250 MBR thickener is available from Hercules, Inc.
AMP ®-95 pH buffer is available from Angus
Nopocide N-96 fungicide is available from Henkel Corporation
Colloid 643 defoamer is available from Vinings corporation
Tamol ®850-30% dispersant is available from Rohm and Haas Company
KTPP dispersant is available from FMC Corporation
Triton ® N-101 surfactant is available from Rohm and Haas Company
Polyplate ® P delaminated clay is available from J. M. Huber Corporation
Diafil ® 525 flatting agent is available from CR Minerals
Celite ®499 flatting agent is available from Johns Manville Corporation
Texanol 2,2,4-trimethyl-1,3-pentanediol monoisobutyrole is available from Aldrich Chemical Chemical resistance and heat stability comparisons for the inventive flatting agents and Celite 281 showed very similar results. In accelarated weather testing, the inventive flatting pigments maintained excellent sheen and gloss control throughout the exposure. The overall color change of paints containing the inventive flatting agents was similar to that observed for the Celite and Diafil containing plants when using white panels.

EXAMPLE 3

Anti-block agents are commonly employed in polyolefin based films as these films have a natural tendency to stick together. This sticking phenomena is referred to in the industry as "blocking". In this example the anti-blocking capabilities of the inventive product, Sample B, are evaluated against a well known commercial anti-block agent, Superfloss®, available from Johns Manville Company, in a 1-mil blown LDPE film composition. Superfloss is a calcined diatomaceous silica product which, like its flatting pigment counterparts, now suffers from a regulatory and respiratory safety standpoint because of its high crystalline silica content.

Master batches of LDPE resin (Chevron's LDPE 5200) and anti-block additive were produced using a 20% filler loading of either Superfloss or Sample B. These two master batches were each compounded on the ZSK 30 mm twin screw extruder unit at 535 rpm with a melt temperature of 420° F. and at a rate of 26 lbs/hour. These master batch compounds were then added to LDPE resin and ultimately let down to a 0.25 wt. % loading before being produced into blown film for testing. LDPE film of 1 mil thickness was produced by running on a Carvalho blown film line at 145 rpm with a melt temperature of 390° F. A control film containing no anti-block agent was also produced for comparative purposes. The blocking force and haze properties of each film sample were then determined and the test results are summarized in Table 9. The test data of Table 9 clearly show that the structured boehmite product, Sample B, provides essentially equivalent film anti-block and film clarity properties as Superfloss when both are employed in a 1 mil blown LDPE film at a 0.25% loading level. This equivalent film performance thereby offers the plastics compounder a low crystalline silica, drop-in replacement alternative.

TABLE 9

Comparative Anti-Block Evaluations in a 1 mil Blown LDPE Film (Resin = Chevron's LDPE 5200)

| Anti-Block Agent | Anti-Block Loading Level, Wt. % | Blocking Force, gm | Haze, % Opacity |
| --- | --- | --- | --- |
| None | 0.0 | 117 | 7.7 |
| Superfloss | 0.25 | 26 | 7.8 |
| Sample B (of Table 1) | 0.25 | 26 | 8.1 |

The present invention may be embodied in other specific forms without departing from the spirit or essential attributes thereof and accordingly reference should be made to the appended claims rather than the foregoing specification as indicating the scope of the invention.

What is claimed is:

1. A structured boehmite pigment comprising a plurality of alumina monohydrate particles, wherein the alumina monohydrate particles comprise platelets of alumina monohydrate arranged in an aggregated configuration, the structured pigment having:

an aggregate median particle size of about 8 to about 30 microns;

a total pore volume of at least about 0.8 ml/g; and a differential pore volume of less than about 0.3 ml/g.

2. The structured boehmite pigment of claim 1 wherein the median platelet size is from about 0.5 to about 3.0 microns.

3. The structured boehmite pigment of claim 1 wherein the platelets have serrated edges.

4. The structured boehmite pigment of claim 1 wherein the pigment has an aggregate median particle size of about 10 to about 15 microns, a total pore volume of about 0.8 to about 2.5 ml/g, and a differential pore volume of less than about 0.2 ml/g.

5. The structured boehmite pigment of claim 1 further having a linseed oil absorption of about 70 to about 135 ml/100 g, a BET surface area of about 3 to about 20 $m^2/g$, and a TAPPI brightness of at least about 90.

6. The structured boehmite pigment of claim 5 wherein the pigment has a linseed oil absorption of about 90 to about 105 ml/g, a BET surface area of about 5 to about 10 $m^2/g$, and a TAPPI brightness of about 94 to about 98.

7. The structured boehmite pigment of claim 1 wherein the pigment contains about 0.1 to about 3.5 weight percent alkaline earth metal oxide.

8. The structured boehmite pigment of claim 7 wherein the alkaline earth metal oxide is selected from the group consisting of magnesium oxide, calcium oxide, strontium oxide and barium oxide.

9. A method of making a structured boehmite pigment comprising the steps of:

(a) providing an alumina trihydrate feed source said alumina trihydrate having a median particle size of from about 8 to about 12 microns;

(b) admixing water to the alumina trihydrate feed source in order to obtain an alumina trihydrate slurry;

(c) admixing a base material to the alumina trihydrate slurry;

(d) converting the alumina trihydrate in the admixture of step (c) to boehmite by subjecting the admixture to heat and pressure, said boehmite comprising platelets of alumina monohydrate arranged in an aggregated configuration.

10. The method of claim 9 wherein the step of converting is effected at a temperature of about 150° C. to about 250° C. and a pressure of about 70 to about 580 psia.

11. The method of claim 9 wherein the step of converting is effected in a stirred pressure reactor.

12. The method of claim 11 wherein the admixture is subjected to heat and pressure in the stirred pressure reactor at a residence time of from about 20 to about 90 minutes.

13. The method of claim 9 wherein said base material is an alkaline earth metal hydroxide.

14. The method of claim 9 wherein said base material is selected from the group consisting of calcium hydroxide, magnesium hydroxide, strontium hydroxide and barium hydroxide.

15. The method of claim 9 further including the steps of filtering the admixture of step (d) to a desired solids content and then drying the filtered admixture to yield a dry structured boehmite pigment.

16. The method of claim 9 wherein said base material is added in an amount of from about 0.5 to 5.0 mole % on a dry aluminum hydroxide molar basis.

17. The method of claim 9 wherein said converting step comprises forming alumina monohydrate platelets having serrated edges.

18. A paint composition comprising a structured boehmite pigment prepared in accordance with claim 9 as a flatting agent.

19. A plastic film comprising a structured boehmite pigment prepared in accordance with claim 9 as an antiblock agent.

* * * * *